Patented Feb. 24, 1953

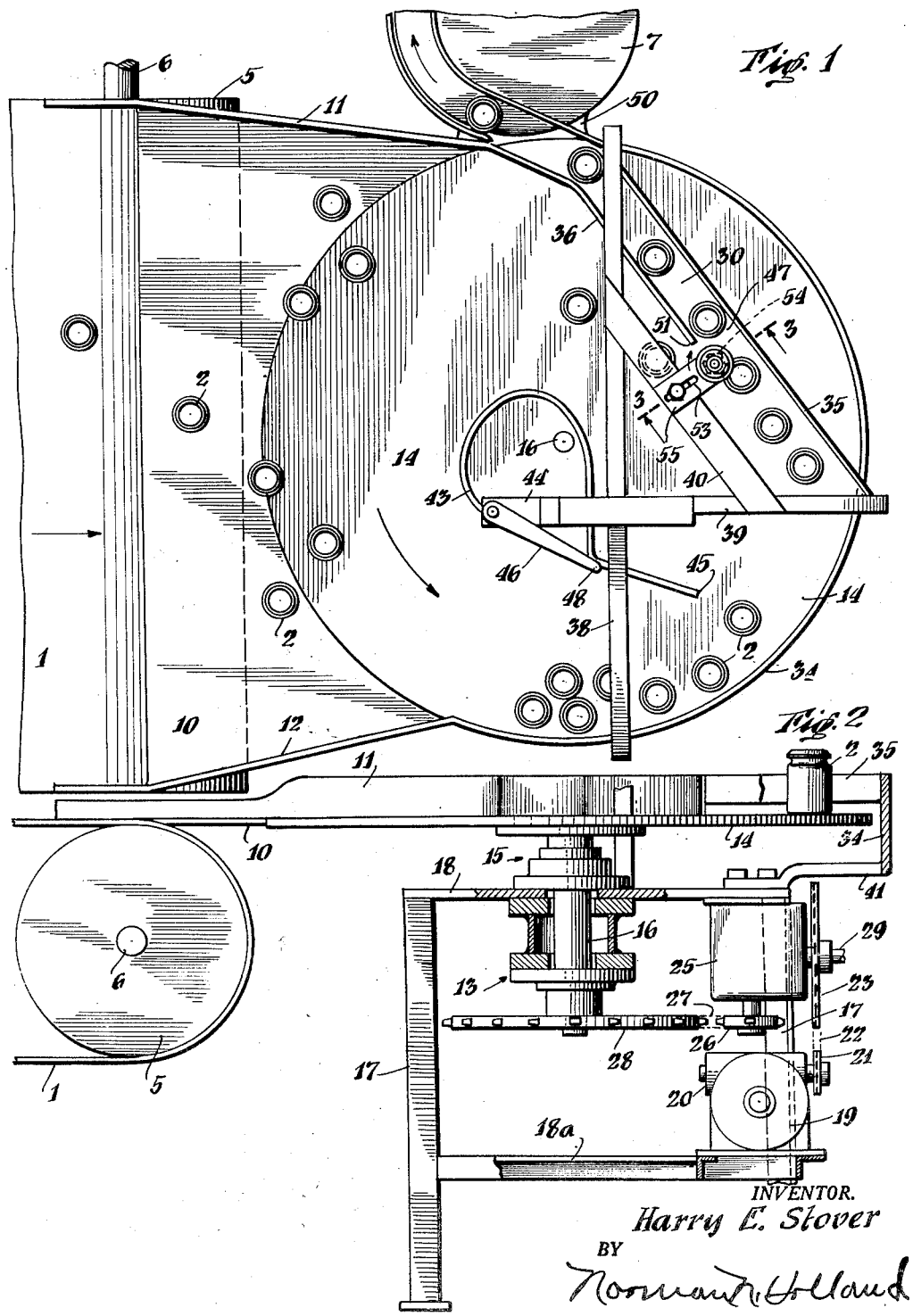

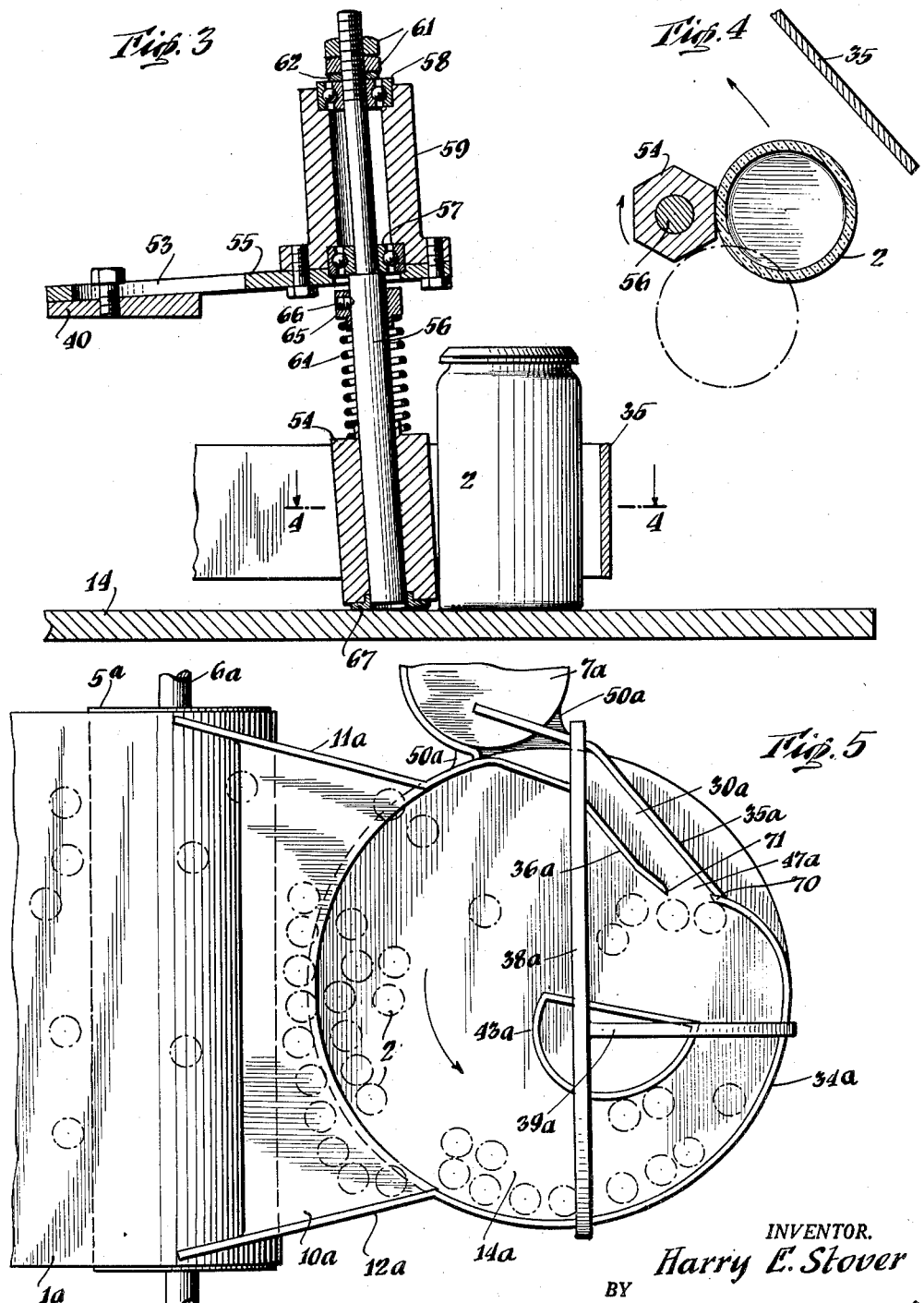

2,629,481

UNITED STATES PATENT OFFICE 2,629,481

ARTICLE ARRANGING APPARATUS

Harry E. Stover, Lancaster, Ohio, assignor to Anchor Hocking Glass Corporation, Lancaster, Ohio, a corporation of Delaware Application June 4, 1948, Serial No. 31,000

8 Claims. (Cl. 198—30)

The present invention relates to an apparatus or mechanism and to a method for arranging articles, and more particularly to an apparatus and method for transforming articles such as glass containers from massed or crowded together relationship into a single file or row.

At one stage in the production of containers such as glass bottles or jars it is desirable to move the containers through an annealing leer while in massed together or closely packed relationship across substantially the entire width of a relatively wide moving leer conveyor. At a subsequent production stage it is desirable that the containers pass in single file or row through inspection apparatus so that defective or undesirable containers may be readily detected and removed. The very different container arrangements utilized at these two stages of production makes highly desirable the provision of an apparatus or mechanism for automatically and continuously moving containers from the leer conveyor to the inspection apparatus and transforming them from closely packed or congested grouping into single file arrangement. The foregoing is one example of an instance where such an arranging apparatus or mechanism is highly desirable. In the glass container manufacturing industry such devices for aligning glass containers into single file are generally referred to as "unscramblers."

Various expedients have been attempted in endeavoring to arrive at a satisfactory device for simultaneously moving containers and placing them into single file arrangement. Previous structures are, however, deemed objectionable for various reasons. Many of them do not effectively and continuously arrange containers in single file but are subject to frequent clogging or jamming and breakage of containers; thus the services of an operator are required in order to release jams, clear accumulated containers and remove broken container fragments. Still other mechanisms are too complicated or include numerous moving parts which are subject to wear, misalignment and breakage. Previous container arranging expedients and methods have left much to be desired.

The present invention aims to overcome the above and other difficulties or disadvantages by providing a new and improved method and apparatus, of relatively simple construction and operation, for continuously and automatically arranging articles such as glass containers into single file arrangement with minimum or no possibility of jamming or breakage of the articles.

An object of the present invention is to provide a new and improved article orienting or arranging apparatus.

Another object of the invention is to provide a new and improved method of orienting or arranging articles.

Another object of the invention is to provide a new and improved apparatus for continuously arranging moving articles into a moving single line or file.

Another object of the invention is to provide new and improved container arranging apparatus adapted to recirculate or "by-pass" certain containers during operation of the apparatus.

Still another object of the invention is to provide new and improved article arranging apparatus adapted to divert unsuitably aligned articles away from a single file forming location.

A still further object of the invention is to provide new and improved article arranging apparatus of relatively simple construction and operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhausted nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

In the accompanying drawings,

Fig. 1 is a top plan view showing a preferred embodiment of the present invention;

Fig. 2 is a side elevational view, partly broken away and partly in section, of the apparatus shown in Fig. 1;

Fig. 3 is a sectional view taken along the line 3—3 of Fig. 1;

Fig. 4 is a sectional view taken along the line 4—4 of Fig. 3; and

Fig. 5 is a top plan view showing a modified form of article arranging apparatus.

Referring more particularly to the preferred embodiment of the invention illustrated in Figs.

1 through 4 of the drawings, there is shown the discharge end of a leer conveyor belt 1 which is adapted to support, over substantially its entire width and length, containers 2. The conveyor belt 1 may be carried by and adapted to travel slowly over and around a pulley or roller 5 supported on a shaft 6; as the shaft 6 and roller 5 rotate in clockwise direction (Fig. 2) articles carried on the upper surface of the belt 1 are moved progressively through an annealing oven or chamber (not shown) and are discharged onto the substantially flush upper surface of a stationary apron or dead plate 10.

The apparatus shown in Figs. 1 and 2 intermediate the apron 10 and the entrance to an article transferring disc 7 is adapted to receive closely grouped-together articles or containers from the apron 10, orient or align them into single file arrangement, and discharge them onto the transfer disc 7, from which they may be discharged in single file onto a moving inspection line belt (not shown).

Containers are pushed onto the apron 10 by succeeding slowly moving masses of articles or containers carried on the belt 1. The containers are pushed over the upper surface of the apron 10 between spaced side wall retaining members or guides 11 and 12 toward and onto the upper surface of a rotatable member or disc 14, the upper surface of which is substantially flush with the upper surface of the apron 10. Adjacent edge surfaces of the belt 1 and apron 10 and of the apron 10 and the rotatable disc 14 are positioned closely adjacent each other so that containers pass over the small intervening spaces without upsetting or any other objectionable disruption in their forward movement.

The rotatable member or disc may be supported adjacent the upper end of an upright rotatable shaft 16 carried in suitable bearings 13 and 15 mounted on a framework comprising legs 17 and a platform 18. Rotation of the member or disc 14 may be obtained by an electric motor 19 through the intermediation of a speed reducer 20, sprocket 21, drive chain 22, sprocket 23, gear box 25, sprocket 26, drive chain 27, and sprocket 28 secured to the rotatable shaft 16. Any other suitable drive means, such as pulleys and belts or gears may be utilized. The drive motor may be carried by a supplemental platform 18a and may be adjustably retained to permit taking up slack in the drive chain 22.

If desired the transfer disc 7 may be driven by a take-off shaft 29 connected with the shaft upon which the sprocket 23 is mounted, or with the shaft upon which is mounted the sprocket 21.

As shown (Fig. 1) the rotatable member or disc 14 turns in counterclockwise direction and containers or other articles pushed from the apron 10 onto adjacent edge portions of the moving disc 14 and are moved continuously away from between the spaced apron side guide walls 11 and 12. Rotation of the disc 14 moves the containers toward and along a guide wall 34 shown extending upwardly from outer portions of the disc 14; this latter guide wall retains containers on the disc as they move around therewith. Movement of the disc carries containers past the marginal guide wall 34 and toward an additional upwardly projecting article guiding wall 35, which guides or directs the moving containers toward a guide channel 30 provided by the article guiding wall 35 and a shorter opposite wall 36. The opposite wall 36 is spaced from the wall 35 a distance slightly greater than the width or diameter of containers being moved by the rotating disc 14; these two walls may be adjustably mounted so as to facilitate the accommodation of various sizes of containers.

The marginal guide wall 34, the additional article guiding member 35, and the spaced or channel forming guide member 36 may be supported in position above the moving surface of the member or disc 14 by supporting members 38, 39 and 40 which extend over the disc 14 and are held in position by brackets 41 bolted to the framework platform 18.

In operation containers move relatively slowly onto the rotating member 14, and not at so great a rate as to fill or congest all its available surface with containers.

In the event some containers are pushed a sufficient distance toward the center portion of the rotating disc, they are directed or deflected outwardly toward outer portions of the disc, and prevented from congregating at the central part of the disc, by guide means 43 (Fig. 1) carried by a supporting arm 44; the supporting arm 44 is secured to the same support braces 38 and 39 as carry the previously mentioned container guiding walls 35 and 36. This centrally disposed container guiding means 43 extends downwardly sufficiently close to the surface of the rotating disc 14 to direct moving containers outwardly. After such outwardly deflected containers pass beyond the free end 45 of the guide member 43, they are carried by the moving disc 14 toward the additional guide wall 35 in a manner similar to that already described with reference to containers which are not pushed inwardly a sufficient amount to contact the curved guide 43.

The centrally disposed guide means 43 may be adjustably mounted in any suitable manner so that the space between it and the guide walls 34, 35, 36 may be varied as desired. In Fig. 1 a supporting member 46 is shown which assists in supporting the guide 43 adjacent the outer end of the support member 46. The support member 46 may be moved about its inner end, to shift the position of the guide member 43, and thereafter locked or clamped into set position.

Containers which are moved by the rotatable disc gradually approach the entrance 47 to the channel 30 provided by the spaced guide walls 35 and 36. The majority of containers slide along the guide wall 35 as the disc 14 moves and are in position to move directly into the open entrance 47 of the guide channel 30. The guide wall 35 extends across the surface of the rotating disc 14 at an angle to the marginal guide wall 34 so as to press containers inwardly; the tendency of the rotating disc 14 is to press containers outwardly against the guide wall 35 and to cause them to slide along the latter wall. Such containers pass in single file readily into the mouth 47 of the channel 30 and are moved by the rotating disc 14 along through the channel between the walls 35 and 36, and over a dead plate 50 positioned intermediate the rotatable disc 14 and the adjacent transfer disc 7. The transfer disc 7 receives the containers and carries them in single file arrangement away from the rotatable disc 14 and dead plate 50 to deliver them in aligned relationship onto a moving conveyor belt of a line inspection apparatus, or to any other desired mechanisms.

Containers which are positioned sufficiently far away from the outer guide wall 35, or inwardly on the rotatable disc 14, do not enter the channel mouth 47 but "by-pass" the channel 30 and re-circulate; upon a second "pass" such containers are directed outwardly by the centrally disposed guide means 43 toward the marginal guide wall 34 and toward the angularly disposed guide wall 35; if, upon such subsequent "pass," the containers are sufficiently aligned with the entrance 47 to the channel 30 they will pass between the guide walls 35 and 36.

Articles or containers which approach close to the entrance 47 of the channel 30, but which are neither in position to readily enter into the channel mouth 47 nor to pass entirely clear of it, as described in the preceding paragraph, are deflected or moved "laterally" away from the entrance 47 by a diverter means or roller-like member 54 positioned adjacent the end 51 of the inner channel-forming wall 36. The guide rotor or diverter 54 may be carried adjacent the lower end of an upwardly extending rotatable shaft 56 which is mounted for free rotation in ball bearings 57 and 58 carried adjacent the upper and lower portions of a body member 59. The body member 59 may be bolted to a bracket 55, which is in turn bolted to the cross brace 40 (Figs. 1 and 3); an elongate slot 53 may be formed in the bracket 55 to provide for adjusting the guide rotor 54. The shaft 56 may be retained in position within the bearings 57 and 58 by nuts 61 threaded onto the upper end of the shaft 56 and bearing against a washer or spacer member 62.

In Fig. 3 the roller-like deflector member 54 is shown urged downwardly toward the surface of the disc 14 by yieldable means or spring 64 abutting at its lower end against the rotor 54 and at its upper end against a collar 65 retained on the shaft 56 by a set screw 66. Wearing of the lower end of the rotor member 54 may be prevented by providing it with a separate "foot" 67, made of steel, fiber, or the like, which contacts the upper surface of the rotatable disc 14. The roller 54 may be made of metal, rubber, synthetic plastic materials, or the other suitable materials.

The axis of the roller or rotor member 54 is preferably inclined or tilted (Fig. 3) from the vertical so that an inner edge of the roller member 54 or the wear-reducing member 67 contacts the rotating disc 14. The tilt is shown somewhat exaggerated in Fig. 3 for clarity of illustration. As the disc 14 rotates in counter-clockwise direction (Fig. 1) the roller-like member 54 is caused to rotate in an opposite sense or direction, namely clockwise. Containers or other articles which are not sufficiently aligned with the entrance opening 45 as to readily pass thereinto contact the rotating roller member 54 and are deflected by it inwardly away from the channel entrance portion 47.

In order to provide an increased or enhanced deflecting or directive effect the roller-like member 54 is preferably provided with a plurality of flat sides (Fig. 4). These flat sides increase the tendency to deflect "misaligned" containers inwardly toward central portions of the rotating disc 14.

Containers which are thus deflected inwardly of the disc 14 by the roller member 54 re-circulate around with the rotating disc 14 to make one or more subsequent passes at the channel entrance 47. Eventually any particular container will be found to slide along the guide wall 35 and enter the space between the spaced guides 35 and 36 for single file alignment therein. The relatively slow rate of movement of the leer belt 1 and the more rapid rotation of the disc or member 14 co-operate with the rotor 54 to effectively feed containers between spaced guide walls 35 and 36 for alignment. Jamming or congestion of containers at any point in the apparatus is reduced to a minimum or entirely eliminated and containers feed smoothly and effectively in continual fashion toward and into the channel 30 between the guide walls 35 and 36. In operation containers are continuously arranged into single file relationship and move along through the channel 30.

As previously brought out, containers which are sufficiently aligned with the entrance 47 of the single-file-arranging guideways 35 and 36 are not deflected inwardly toward the center of the rotating disc 14 by the rotor 54. The roller 54 tends to direct inwardly only those containers which might create jamming or congestion at the entrance to the file-arranging guideways.

In some instances it might be desired to have the rotor 54 turn in the same direction as the rotatable disc 14 and this may be achieved by providing an outwardly inclined axis of rotation for the rotor 54, so that the latter contacts the disc 14 at an outer rotor edge. In actual practice the opposite sense rotation of the rotor 54 gives highly effective results and is preferred.

In Fig. 5 there is shown a modified form of the invention wherein a leer belt 1a delivers containers to an apron 10a and a rotatable member or disc 14a moves the containers away from the discharge end of the apron 10a. A centrally disposed container guide means 43a, generally similar to that disclosed in connection with the preferred embodiment, is utilized for directing containers outwardly toward a marginally disposed guide wall 34a. In this modification, however, the marginally disposed guide wall 34a terminates in an inwardly curved or extending end 70 which is substantially in line with an oppositely disposed edge portion 71 of a channel-forming guide wall 36a. The end portion of the inner channel-forming wall 36a is inclined slightly toward the end portion 70 of the marginal guide wall 34a.

Jars, containers or other articles which move along the marginal wall 34a pass around the end portion 70 thereof, under the influence of the rotating disc or member 14a, and into the open mouth 47a between the inner and outer channel-forming guide walls 35a and 36a. Containers which are sufficiently aligned with the entrance mouth 47a move readily into the space between the spaced channel walls 35a and 36a and are arranged into moving single file.

Containers which move off the end portion 70 without passing readily into the mouth portion 47a, strike the leading edge or forward edge 71 of the inner channel wall 36a. Containers which strike the end 71 at substantially their middle portion, or portions thereof disposed inwardly toward the mouth 47a, are pushed off the end portion 71 by succeeding containers. Such deflected containers are re-circulated by the rotating disc 14 and make subsequent passes at the mouth portion 47a, eventually finding their way into it.

In order to further minimize or prevent the possibility of jamming, the end portion 70 of the guide wall 34a, the guide wall 34a itself, and the centrally disposed guide means 43a are preferably spaced from each other at their closest points by a distance not less than three times the width or diameter of containers which are being arranged into single file relationship. This spacing distance minimizes or eliminates the possibility of jamming of the jars adjacent the entrance mouth 47a.

While any suitable shape or form of central guide member may be utilized it has been found that one having a substantially involute shape gives good results.

While the present apparatus and method have been described chiefly with reference to the arranging into single file of articles such as bottles, jars, containers and the like it is readily adaptable to use for arranging various other articles into line.

It will be seen that the present invention provides a new and improved apparatus and method for arranging containers or other articles into definite relationship, namely single file relationship. Articles are continuously and automatically arranged into a moving single line and discharged onto a conveyor belt, table or the like.

Articles which are not arranged upon a first pass are re-circulated or by-passed and are arranged into single file relationship upon a subsequent pass; the re-circulating or by-passing feature is highly effective in preventing objectionable accumulations or jamming of containers in connection with their arrangement into single file relationship. The roller-like deflecting or diverting means "picks out" and deflects those containers which are not suitably located for ready arrangement into single file relationship. The apparatus and mechanism are of relatively simple construction and operation.

Actuation of the guide rotor from the surface of the rotatable disc serves to turn the diverting roller at a speed dependent upon the speed of rotation of the disc itself; this is effective to deflect unsuitably positioned containers at a speed which is a function of the movement of the rotatable disc itself, and in this manner the possibility of throwing containers violently aside and subjecting them to breakage is minimized. Rotation of the guide rotor is preferably in a sense opposite to that of the rotatable disc and deflects misaligned containers away from the mouth of a channel; the apparatus is highly effective in minimizing or preventing objectionable accumulations or jamming of containers at the entrance portion of the guiding channel.

The simple and rugged construction of the apparatus makes it well adapted to withstand rough usage and to continue to operate for long periods of time without requiring costly inspection, maintenance and repairs.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A container aligning device of the class described comprising the combination of a generally horizontal rotatable disc, a pair of oppositely spaced container guiding walls each extending over said disc adjacent one side thereof for receiving upright containers therebetween, roller-like container directing means adjacent an end of one of said container guiding walls and normally spaced from the other wall a distance greater than the diameter of containers to be aligned, said roller-like means being rotatable about an upwardly extending axis and in contact with the upper surface of said disc, rotation of said disc effecting rotation of the roller-like means.

2. A device as claimed in claim 1, in which said roller-like article directing means has a plurality of flat faces about its periphery.

3. A device as claimed in claim 1, in which said roller-like means contacts the upper surface of said disc at only one lower edge portion of the roller-like means.

4. A device as claimed in claim 1, in which means is provided for yieldably urging the roller-like means downwardly into contact with the surface of said disc.

5. A container aligning device of the class described comprising the combination of a generally horizontal rotatable disc, a pair of oppositely spaced container guiding walls adjacent an edge of said disc for receiving upright containers therebetween, one of said walls having a terminal end disposed over said disc, and roller-like container directing means adjacent said terminal end and in alignment with adjacent portions of said one wall, said roller-like means being rotatable about an upwardly extending axis and in contact with a portion of said disc, rotation of said disc effecting rotation of the roller-like means.

6. A device as claimed in claim 5, in which a member is provided over said disc for directing containers away from central portions of the disc and toward the periphery thereof.

7. A device as claimed in claim 5, in which means is provided for yieldably urging the roller-like means toward said disc.

8. A device as claimed in claim 5, in which means is provided for yieldably urging the roller-like means toward said disc, and in which said roller-like means contacts a portion of this disc adjacent only one lower edge portion of the roller-like means.

HARRY E. STOVER.

REFERENCES CITED

The following references are of record in the file of this patent:

UNITED STATES PATENTS

| Number | Name | Date |
|---|---|---|
| 971,999 | Hodge | Oct. 4, 1910 |
| 1,195,054 | McLeod | Aug. 15, 1916 |
| 1,510,097 | Miller | Sept. 30, 1924 |
| 2,047,106 | Lidberg et al. | July 7, 1936 |
| 2,060,182 | Dellaree | Nov. 10, 1936 |
| 2,176,659 | Mundy | Oct. 17, 1939 |
| 2,268,897 | Price | Jan. 6, 1942 |
| 2,280,522 | Hahn | Apr. 21, 1942 |
| 2,389,496 | Gagnon et al. | Nov. 20, 1945 |
| 2,437,721 | Barganz et al. | Mar. 16, 1948 |
| 2,524,248 | Albertoli | Oct. 3, 1950 |
| 2,541,300 | Silva | Feb. 13, 1951 |

FOREIGN PATENTS

| Number | Country | Date |
|---|---|---|
| 109,097 | Australia | Nov. 23, 1939 |